United States Patent Office 3,133,969
Patented May 19, 1964

3,133,969
METHODS OF PRODUCING BORON CONTAINING MATERIALS
George F. Huff, Fox Chapel, and Richard M. Hunt, Oak Hills Manor, Pa., assignors to Callery Chemical Corporation, Pittsburgh, Pa., a corporation of Pennsylvania
No Drawing. Filed May 13, 1958, Ser. No. 736,437
7 Claims. (Cl. 260—606.5)

This invention relates to a process for increasing the boron content of compounds, and mixtures containing said compounds, that contain boron, carbon and active hydrogen, and to products obtained by the process.

This application is a continuation-in-part of our copending application Serial No. 546,822, filed November 14, 1955, which in turn is a continuation-in-part of our application Serial No. 463,626, filed October 20, 1954, both now abandoned.

In the copending patent application of William H. Schechter and James D. Klicker, Serial No. 402,805, filed January 7, 1954, and now abandoned and its continuation-in-part Serial No. 564,365, filed February 9, 1956, there are disclosed processes, and products produced thereby, for making liquid organic derivatives of diborane. As disclosed in those applications, unsaturated aliphatic hydrocarbons such, for example, as lower alkenes such as ethylene and propylene, lower alkynes such as acetylene and lower alkadienes such as butadiene, can be reacted with diborane in a mol ratio of said hydrocarbon to diborane that does not exceed 6 to 1 to produce organoboron compounds and mixtures of such compounds which are characterized in that they contain boron, carbon and active hydrogen and are particularly useful as high energy fuels. As further disclosed in that application, the additional reaction of diborane with the aforementioned reaction product can be carried out.

It is an object of the present invention to provide a process for producing products having high boron contents from lower alkyl diboranes and from active hydrogen-containing reaction products of diborane and unsaturated lower aliphatic hydrocarbons.

It is a further object to provide a process for producing products having high boron contents and, therefore, better fuel values, from alkyl diboranes and from active-hydrogen-containing reaction products of diborane and unsaturated lower aliphatic hydrocarbons in a simple and easily practiced manner.

We have discovered that upon reacting diborane with a lower alkyl diborane, or a liquid reaction product of diborane and an unsaturated aliphatic hydrocarbon, which product contains active hydrogen, at an elevated pressure and a moderate temperature, in the absence of air, oxygen or moisture, there is produced a liquid product containing boron, carbon and active hydrogen. The products obtained in accordance with this discovery are characterized, surprisingly, by greater stability, low volatility and a greatly increased proportion of boron and, therefore, have a correspondingly higher heat of combustion, than the starting material.

The method of the present invention is carried out at a temperature of, for example, room temperature to about 100° C., and more suitably 70° to 100° C. The pressure of reaction is at least about 150 p.s.i.g. and preferably is within the range of about 250 p.s.i.g. to 1800 p.s.i.g., though higher pressures can be used if desired. The reactants are mixed and pressurized at about room temperature and then heated to effect reaction. The reaction generally is carried out for at least about ½ hour and usually for about 1 to 8 hours. Longer reaction times have been used and improved boron contents have resulted therefrom. However, it may be found that the results achieved through longer reaction periods do not justify extended treatment.

The alkyldiboranes that are contemplated for use in this invention have the general formula $B_2H_{6-x}R_x$, where $x$ is a whole number from 1 to 4 and R is a lower alkyl radical. Typical alkyl diboranes include methyl diboranes, ethyl diborane, diethyl diborane, triethyl diborane, tetraethyl diborane, mono-, di-, tri-, and tetra- propyl diboranes, mono-, di-, tri-, and tetrabutyl diboranes, and so on. Mixtures of lower alkyl diboranes, such as those disclosed in the copending application of Schechter et al., Serial No. 402,805, filed January 7, 1954, can be used. Those products contain from about 70 to 98 weight percent of lower alkyldiboranes with the remainder being essentially alkylated higher boranes.

Alkyldiboranes and related products, characterized as to the presence of boron, carbon and active hydrogen but not identified structurally, result upon reacting diborane and the unsaturated lower aliphatic hydrocarbon using a molar ratio of hydrocarbon to diborane not exceeding about 6 to 1, and suitably on the order of 1 to 1 or 2 to 1. That reaction can be carried out at temperatures up to about 150° C. and is conducted in the absence of air or moisture. While the mixtures of lower alkyldiboranes and related products obtained in accordance with the Schechter et al. process are preferred, other mixtures containing particular alkyldiboranes in any desired proportions can be prepared, as by mixing the single members, and be used in practicing our invention without departing from its scope.

The invention can be practiced with the reaction products of unsaturated lower aliphatic hydrocarbons and diborane which are reacted in a ratio not greater than 6 to 1 without regard to the actual chemical identification of compounds that may be present provided that it is known that products containing boron, carbon and hydrogen are present and that part of the hydrogen is active hydrogen, or hydrogen that is releasable upon hydrolysis. Many very useful fuels have been made with such starting materials. Since the ultimate product is useful primarily either as a fuel, it is apparent that the actual chemical constitution of the product or of the reactant need not be known. This is so because the interest in the products as fuels centers upon the heat of combustion, stability, volatility and the like, rather than chemical composition. Where the heat of combustion per unit weight is high, it is apparent that the products are useful as fuels and more useful than other fuels that have lower heats of combustion on the same basis.

The invention will be described further in conjunction with the following examples. It should be understood that the details disclosed are given by way of illustration and are not to be construed as limiting the invention.

EXAMPLE I

About 34.8 grams of a liquid reaction product of diborane and ethylene, which was composed primarily of ethyl diboranes and analyzed at 13.3 millimols of hydrolyzable hydrogen per gram and 14.5 milligram atoms of boron per gram, were placed in an evacuated autoclave. Then 16.7 grams of diborane, under pressure, were added to the autoclave in increments. After all the diborane was added, the autoclave was pressurized further by the addition of hydrogen. The mixture was then heated and stirred for 4 hours at 80° C. During this time, the pressure exceeded 150 p.s.i.g. A yellow liquid product was obtained from the autoclave after cooling. This product analyzed at 51.3 millimols of hydrolyzable hydrogen per gram and 44.3 milligram atoms of boron per gram, and therefore contained over 300 percent as much boron per gram as the starting material.

EXAMPLE II

About 55 ml. of the same reaction product used in Example 1 and which had the same analysis were placed in an evacuated autoclave and pressured with 375 p.s.i.g. of diborane. The mixture was heated 1½ hours at 100° C. during which time the pressure rose to 1750 p.s.i.g. After cooling the autoclave and separating the resulting yellow liquid product from gases and solids, the product was found to contain 63.2 millimols of hydrolyzable hydrogen per gram and 31 milligram atoms of boron per gram. About 14 ml. of this yellow liquid product were then retreated in the autoclave by pressurizing with diborane to 275 p.s.i.g. The autoclave was heated for 4 hours at a temperatdure within the range of 70° to 90° C. during which time the pressure rose to 550 p.s.i.g. The autoclave was then cooled and syrupy liquid was recovered. This analyzed at 20.1 millimols of hydrolyzable hydrogen per gram and 61.3 milligram atoms of boron per gram.

The ultimate product obtained in Example II contains over 400 percent as much boron per gram as the starting material.

EXAMPLE III

A third sample of the ethyl diborane-containing reaction product used in Examples I and II was used in this example. About 36 ml. of the reactant were placed in the autoclave and pressured with diborane to a pressure of 400 p.s.i.g. A quantity of dry nitrogen was then introduced into the autoclave and the resulting mixture was heated for one hour at 100° C. The liquid product obtained thereby was analyzed and found to contain 16.0 millimols of hydrolyzable hydrogen per gram and 44.9 milligram atoms of boron per gram. This boron content per gram is about 300 percent greater than the boron content of the starting material.

Considering the foregoing examples it is apparent that our invention provides a convenient and simple method for producing materials with increased boron content, and therefore a higher heat of combustion, from mixtures containing alkyldiboranes. It is further apparent that this advantage results even in the presence of an added gas such as nitrogen or hydrogen.

EXAMPLE IV

A series of runs were made to note the effects on the product of varying the reaction conditions. In each of these runs, liquid reaction products of diborane and acetylene obtained upon circulating those materials for up to 8 hours through a packed column heated to about 75° C. at a rate of 25 mols of each reactant per minute were used. The resulting liquid products contained boron and active hydrogen contents as set forth in the Table I below.

The procedure for each of these runs was as follows. The active hydrogen containing acetylene-diborane reaction product was charged to a high pressure autoclave and then pressurized with diborane at room temperature. The autoclave was then heated for various periods of time. Thereafter the autoclave was opened and the liquid product obtained was analyzed for boron and active hydrogen. The data obtained are as follows:

*Table I*

| Run No. | ADB[1] charged, mls. | Diborane charged, p.s.i.g. | Temp., °C. | Time of Heating, hrs. | Analysis of ADB charged H[2] | Analysis of ADB charged B[3] | Analysis of Liq. Reac. Prod. H | Analysis of Liq. Reac. Prod. B |
|---|---|---|---|---|---|---|---|---|
| 1 | 135 | 350 | 70 | 1 | 44.5 | 39.4 | 26.6 | 45.4 |
| 2 | 50 | 380 | 90 | 2 | 50.7 | 32.3 | 57.4 | 39.7 |
| 3 | 25 | 420 | 70 | 4 | 50.7 | 33.7 | 45.4 | 42.3 |
| 4 | 25 | 400 | 70 | 4 | 32.3 | 32.3 | 51.9 | 45.0 |
| 5 | 15 | 390 | 70 | 7 | 41.7 | 32.0 | 32.2 | 48.4 |
| 6 | 15 | 397 | 66 | 22 | 45.2 | 31.0 | 37.3 | 43.8 |

[1] ADB represents the liquid reaction product of diborane and acetylene.
[2] H is expressed in millimols of hydrogen evolved upon the complete hydrolysis of one gram of sample.
[3] Boron is expressed as milligram atoms per gram of sample.

From these data it is apparent that our process, involving pressurized treatment with diborane of a diborane-unsaturated aliphatic hydrocarbon reaction product that contains boron and active hydrogen, significantly raises the boron content thereby indicating a corresponding increase in the heat of combustion. The above listed analyses show only the boron and hydrogen content of these fuels since it has been found that the amount of these elements present in a boron-carbon-hydrogen fuel is a measure of its heat of combustion and its value as a fuel. The carbon content of the fuel can be estimated by the empirical relation $B+C=75\pm5$ where B and C are expressed in milligram atoms per gram of fuel sample. We have also found that if the autoclave is pressurized with diborane at room temperature and then heated, rather than using the reverse procedure, the formation of significant quantities of solids is avoided. In this process, where ethylene is the hydrocarbon used to produce the starting material, the resulting products have a boron content of about 30 to 60 milligram atoms per gram and evolve about 15 to 65 millimols of hydrogen per gram upon hydrolysis; where acetylene is used, our products have a boron content of about 40 to 50 milligram atoms per gram and evolve about 25 to 60 millimols of hydrogen per gram upon hydrolysis.

Based on experimental evidence we have also determined that a heating time on the order of about 1 hour appears to be required to produce a particularly desirable fuel. Additional heating results in some increase in boron content but it normally is not sufficient to make extended periods of heating economical. We have also found that the use of temperatures exceeding about 100° C. results in the production of resinous solids rather than liquid products. For the runs reported in Table I above, we noted that during heating a large increase in pressure occurred from about 250 p.s.i.g. to about 1000 p.s.i.g. as a result of hydrogen evolution during the reaction.

EXAMPLE V

A series of tests were made to determine the advantage, if any, in an additional treatment of the products obtained in accordance with this invention with diborane under pressure. In these tests an active-hydrogen-containing diborane-acetylene liquid reaction product and diborane were charged into a high pressure autoclave as before and heated. After a period of heating, the autoclave was cooled, gases and solids formed were separated and additional diborane was added to the remaining liquid. The mixture was reheated and the product produced was analyzed for hydrogen and boron. The data obtained are as follows:

*Table II*[1]

| Run No. | ADB charged, ml. | Diborane charged, p.s.i.g. | Temp., °C | Time of heating, hrs | Analysis of ADB charged H | Analysis of ADB charged B | Ultimate liq. prod. H | Ultimate liq. prod. B |
|---|---|---|---|---|---|---|---|---|
| 1 | 125 | 390 | 70 | 2 | 50.7 | 32.3 | --- | 38.7 |
| 2 | Liq. Pdt. from Run 1. | 360 | 70 | 4 | --- | 38.7 | --- | 83.6 |
| 3 | 200 | 400 | 68 | 18 | 52.8 | 31.4 | 44.5 | 41.3 |
| 4 | Liq. Pdt. from Run 3. | 400 | 68 | 18 | 44.5 | 41.3 | 26.6 | 45.4 |

[1] The abbreviations used are the same as in Table I.

From these data, it is apparent that an additional diborane treatment results in a still higher boron content. However, the improvement is not as dramatic as that resulting in Examples I to III.

The mechanism involved in the present invention whereby improved stability and higher boron contents are produced is not known, although it is believed that the organo-boron fuel used as a starting material reacts, coordinates or complexes with the diborane under pressure to result in a more stable composition. Experience with the invention wherein alkyldiboranes and diborane are reacted has shown that the products obtained are largely alkyllated higher boranes, e.g. primarily alkyl decaboranes with some alkyl pentaboranes and alkyl tetraboranes, where the alkyl radical present depends on the alkyl present in the starting materials. On the other hand, where diborane and alkyldiboranes are reacted at about atmospheric pressure, the products are primarily alkyldiboranes. The large increase in boron content obtained in this invention is a particularly surprising result as there is no conclusive explanation of why the described pressure procedure should be capable of bringing that about.

The liquid products which are produced by the above reactions are useful as high energy fuels in bipropellant systems. These liquid high energy fuels burn readily with conventional oxidizers, including air and oxygen, and are primarily useful in turbojet, ram jet, and rocket engines. These fuels may be used alone or in mixtures with other fuels toward which they are chemically inert, e.g. most ordinary hydrocarbon fuels. These fuels have a high heat of combustion (greater by 20–50% than the best hydrocarbon fuels), are spontaneously inflammable in air at high temperatures (in excess of 250–300° F.), and have other desirable fuel properties, e.g. large liquidus range, low viscosity, stability against thermal decomposition and moderately resistant to hydrolysis. In actual tests the fuel produced by the above process is used as follows: A sample of the fuel is introduced into the combustion section of a jet test engine, burned with compressed air, and the efficiency of the combustion and output of the engine measured. When this fuel was burned in a test engine it was found to have a heat of combustion more than 20% greater than the best hydrocarbon fuels. The combustion efficiency of this fuel was equal to JP–4 (a standard jet fuel in use for several years past) and the thrust of the engine per unit weight of fuel was substantially greater than the thrust obtained using the best hydrocarbon fuels. In comparative tests on the fuel produced by the above process and other boron-containing high energy fuels and other hydrocarbon fuels it has been found that engine output is directly proportional to the heat of combustion per unit weight of fuel. Thus, an aircraft using a high energy boron-containing fuel can travel proportionately further with the same load or can carry proportionately greater loads than when fueled with conventional fuels.

In accordance with the provisions of the patent statutes, we have explained the principle of our invention and have described what is now considered to represent its best embodiment. However, we desire to have it understood that, within the scope of the appended claims, the invention may be practiced otherwise than as specifically described.

We claim:

1. A method of producing an organo-boron-containing product of high boron content which comprises mixing and reacting in the absence of air and moisture a lower alkyl diborane and diborane at a pressure of at least 150 p.s.i.g. and at a temperature from room temperature to about 100° C. and recovering the resulting reaction product.

2. A method of producing a product of high boron content from a liquid reaction product of diborane and an unsaturated lower aliphatic hydrocarbon which contains boron, carbon and active hydrogen, which comprises mixing and reacting in the absence of air and moisture diborane with such a liquid reaction product at a temperature up to about 100° C. and a pressure of at least about 150 p.s.i.g. and recovering the resulting reaction product.

3. A method according to claim 2 in which said unsaturated hydrocarbon is at least one member selected from the group consisting of lower alkenes, lower alkynes, and lower alkadienes.

4. A method of producing a product of high boron content from a liquid reaction product obtained by reacting diborane and an unsaturated lower aliphatic hydrocarbon in a molar ratio of said hydrocarbon to diborane not exceeding about 6 to 1 which comprises adding diborane in the absence of air and moisture to such a liquid reaction product at a pressure of at least 150 p.s.i.g. and ambient temperature and then heating the resulting mixture at a temperature of not more than about 100° C. and recovering the resulting product.

5. A method in accordance with claim 4 in which said unsaturated hydrocarbon is ethylene, the reaction pressure is in the range of about 250 to 1800 p.s.i.g. and the reaction temperature is about 70° to 100° C.

6. A method in accordance with claim 4 in which said unsaturated hydrocarbon is acetylene, the reaction pressure is in the range of about 250 to 1800 p.s.i.g., and the reaction temperature is about 70° to 100° C.

7. A method of producing a product of high boron content from a lower alkyl diborane which comprises mixing and reacting in the absence of air and moisture diborane and a lower alkyl diborane at a temperature up to about 100° C. and a pressure of at least about 150 p.s.i.g., separating the resulting liquid product from gases and solids, then reacting said liquid product with additional diborane at about the same temperature and pressure first used.

References Cited in the file of this patent
UNITED STATES PATENTS
2,968,533      Lichtenwalter      Jan. 17, 1961

OTHER REFERENCES
Hurd: Pages 86–89, Chemistry of the Hydrides, John Wiley, August 25, 1952.
Whatley: J. Am. Chem. Soc., volume 76, February 5, 1954, pages 835 to 838.
Stock: Berichte 56, page 808 (1923).
Hurd: J. Am. Chem. Soc. 70, pages 2053–2055.

UNITED STATES PATENT OFFICE
CERTIFICATE OF CORRECTION

Patent No. 3,133,969　　　　　　　　　　　　　May 19, 1964

George F. Huff et al.

It is hereby certified that error appears in the above numbered patent requiring correction and that the said Letters Patent should read as corrected below.

Column 4, Table II, right-hand column thereof, for "83.6" read -- 43.6 --.

Signed and sealed this 6th day of October 1964.

(SEAL)
Attest:

ERNEST W. SWIDER　　　　　　　　　　　　　EDWARD J. BRENNER
Attesting Officer　　　　　　　　　　　　　　Commissioner of Patents

UNITED STATES PATENT OFFICE
CERTIFICATE OF CORRECTION

Patent No. 3,133,969                              May 19, 1964

George F. Huff et al.

It is hereby certified that error appears in the above numbered patent requiring correction and that the said Letters Patent should read as corrected below.

Column 4, Table II, right-hand column thereof, for "83.6" read -- 43.6 --.

Signed and sealed this 6th day of October 1964.

(SEAL)
Attest:

ERNEST W. SWIDER
Attesting Officer

EDWARD J. BRENNER
Commissioner of Patents